US011277371B2

(12) United States Patent
Surcouf et al.

(10) Patent No.: US 11,277,371 B2
(45) Date of Patent: Mar. 15, 2022

(54) CONTENT ROUTING IN AN IP NETWORK

(71) Applicant: Cisco Technology, Inc., San Jose, CA (US)

(72) Inventors: Andre Jean-Marie Surcouf, St Leu la Foret (FR); David Delano Ward, Somerset, WI (US); William Mark Townsley, Paris (FR)

(73) Assignee: CISCO TECHNOLOGY, INC., San Jose, CA (US)

(*) Notice: Subject to any disclaimer, the term of this patent is extended or adjusted under 35 U.S.C. 154(b) by 602 days.

(21) Appl. No.: 16/094,967

(22) PCT Filed: Apr. 17, 2017

(86) PCT No.: PCT/US2017/028001
§ 371 (c)(1),
(2) Date: Oct. 19, 2018

(87) PCT Pub. No.: WO2017/184528
PCT Pub. Date: Oct. 26, 2017

(65) Prior Publication Data
US 2019/0149469 A1 May 16, 2019

Related U.S. Application Data

(60) Provisional application No. 62/324,710, filed on Apr. 19, 2016, provisional application No. 62/324,696, (Continued)

(30) Foreign Application Priority Data

Jul. 15, 2016 (GB) ..................... 1612351
Jul. 15, 2016 (GB) ..................... 1612358

(51) Int. Cl.
H04L 29/12 (2006.01)
H04L 12/749 (2013.01)
(Continued)

(52) U.S. Cl.
CPC ........ H04L 61/1511 (2013.01); G06F 16/245 (2019.01); G06F 16/955 (2019.01);
(Continued)

(58) Field of Classification Search
CPC ... H04L 61/1511; H04L 45/34; H04L 45/745; H04L 61/6059; H04L 12/2803;
(Continued)

(56) References Cited

U.S. PATENT DOCUMENTS 6,594,260 B1 7/2003 Aviani, Jr. et al.
6,694,471 B1 2/2004 Sharp
(Continued)

FOREIGN PATENT DOCUMENTS

EP 2938046 A1 10/2015
WO 2016019041 A1 2/2016

OTHER PUBLICATIONS

Examination report dated Sep. 18, 2019 in application EP 17 733 135.2-1213 (10 Pages).
(Continued)

Primary Examiner — Christopher M Crutchfield
Assistant Examiner — Tito Q Pham
(74) Attorney, Agent, or Firm — Merchant & Gould P.C.

(57) ABSTRACT

A method of routing a packet in a network is described. The network includes a plurality of nodes implementing Information Centric Networking (ICN) routing or content centric networking and routing. The method includes receiving the packet at a node implementing ICN routing, the packet comprising an Internet Protocol (IP) header and a packet payload, wherein the packet comprises a request packet for requesting content from the network. The method further includes extracting from the packet payload a content identifier for the requested content and forwarding the packet to
(Continued)

a next hop node in the network based on the content identifier extracted from the packet payload.

20 Claims, 11 Drawing Sheets

Related U.S. Application Data filed on Apr. 19, 2016, provisional application No. 62/324,657, filed on Apr. 19, 2016, provisional application No. 62/324,727, filed on Apr. 19, 2016, provisional application No. 62/324,721, filed on Apr. 19, 2016, provisional application No. 62/340,156, filed on May 23, 2016, provisional application No. 62/340,182, filed on May 23, 2016, provisional application No. 62/340,162, filed on May 23, 2016, provisional application No. 62/340,174, filed on May 23, 2016, provisional application No. 62/340,166, filed on May 23, 2016.

(51) Int. Cl.

| | | |
|---|---|---|
| *H04L 12/28* | (2006.01) | |
| *H04L 29/06* | (2006.01) | |
| *H04N 21/643* | (2011.01) | |
| *H04L 12/723* | (2013.01) | |
| *H04L 12/721* | (2013.01) | |
| *H04L 12/741* | (2013.01) | |
| *H04L 12/745* | (2013.01) | |
| *H04L 12/747* | (2013.01) | |
| *H04L 29/08* | (2006.01) | |
| *H04N 21/2343* | (2011.01) | |
| *H04N 21/658* | (2011.01) | |
| *H04N 21/845* | (2011.01) | |
| *G06F 16/955* | (2019.01) | |
| *H04L 12/725* | (2013.01) | |
| *H04N 21/262* | (2011.01) | |
| *G06F 16/245* | (2019.01) | |
| *H04L 12/743* | (2013.01) | |
| *H04L 12/26* | (2006.01) | |
| *H04L 61/4511* | (2022.01) | |
| *H04L 45/741* | (2022.01) | |
| *H04L 45/748* | (2022.01) | |
| *H04L 45/74* | (2022.01) | |
| *H04L 67/568* | (2022.01) | |
| *H04L 101/659* | (2022.01) | |
| *H04L 65/60* | (2022.01) | |
| *H04L 67/61* | (2022.01) | |
| *H04L 67/1001* | (2022.01) | |
| *H04L 67/63* | (2022.01) | |
| *H04L 61/103* | (2022.01) | |
| *H04L 101/33* | (2022.01) | |
| *H04L 45/50* | (2022.01) | |
| *H04L 45/00* | (2022.01) | |
| *H04L 45/30* | (2022.01) | |
| *H04L 61/45* | (2022.01) | |
| *H04L 65/612* | (2022.01) | |
| *H04L 61/2503* | (2022.01) | |
| *H04L 65/65* | (2022.01) | |
| *H04L 69/326* | (2022.01) | |
| *H04L 101/663* | (2022.01) | |
| *H04L 69/18* | (2022.01) | |
| *H04L 45/7453* | (2022.01) | |
| *H04L 45/745* | (2022.01) | |
| *H04L 61/251* | (2022.01) | |
| *H04L 43/0876* | (2022.01) | |
| *H04L 61/256* | (2022.01) | |
| *H04L 69/22* | (2022.01) | |
| *H04L 67/565* | (2022.01) | |
| *H04L 61/5007* | (2022.01) | |
| *H04L 67/02* | (2022.01) | |
| *H04L 67/1008* | (2022.01) | |
| *H04L 61/00* | (2022.01) | |
| *H04L 65/401* | (2022.01) | |
| *H04N 21/2662* | (2011.01) | |
| *H04L 61/58* | (2022.01) | |
| *H04L 69/329* | (2022.01) | |

(52) U.S. Cl.
CPC .... *H04L 12/2803* (2013.01); *H04L 29/06163* (2013.01); *H04L 29/06517* (2013.01); *H04L 29/08045* (2013.01); *H04L 43/0876* (2013.01); *H04L 45/306* (2013.01); *H04L 45/34* (2013.01); *H04L 45/38* (2013.01); *H04L 45/50* (2013.01); *H04L 45/72* (2013.01); *H04L 45/741* (2013.01); *H04L 45/742* (2013.01); *H04L 45/745* (2013.01); *H04L 45/748* (2013.01); *H04L 45/7453* (2013.01); *H04L 45/7457* (2013.01); *H04L 61/103* (2013.01); *H04L 61/15* (2013.01); *H04L 61/1582* (2013.01); *H04L 61/2007* (2013.01); *H04L 61/251* (2013.01); *H04L 61/2503* (2013.01); *H04L 61/256* (2013.01); *H04L 61/304* (2013.01); *H04L 61/6059* (2013.01); *H04L 61/6063* (2013.01); *H04L 63/1416* (2013.01); *H04L 63/166* (2013.01); *H04L 63/168* (2013.01); *H04L 65/4084* (2013.01); *H04L 65/605* (2013.01); *H04L 65/608* (2013.01); *H04L 67/02* (2013.01); *H04L 67/1002* (2013.01); *H04L 67/1008* (2013.01); *H04L 67/2823* (2013.01); *H04L 67/2842* (2013.01); *H04L 67/322* (2013.01); *H04L 67/327* (2013.01); *H04L 69/22* (2013.01); *H04L 69/326* (2013.01); *H04N 21/23439* (2013.01); *H04N 21/26258* (2013.01); *H04N 21/64322* (2013.01); *H04N 21/6581* (2013.01); *H04N 21/845* (2013.01); *H04N 21/8456* (2013.01); *H04L 61/35* (2013.01); *H04L 61/6009* (2013.01); *H04L 65/4007* (2013.01); *H04L 65/602* (2013.01); *H04L 69/329* (2013.01); *H04L 2212/00* (2013.01); *H04N 21/2662* (2013.01)

(58) Field of Classification Search
CPC ......... H04L 29/06163; H04L 29/06517; H04L 29/08045; H04L 43/0876; H04L 45/306; H04L 45/741; H04L 61/35; H04L 61/6009; H04L 65/602; H04L 2212/00; H04N 21/845; H04N 21/2662
See application file for complete search history.

(56) References Cited

U.S. PATENT DOCUMENTS

| | | |
|---|---|---|
| 8,243,735 B2 | 8/2012 | Jacobson et al. |
| 8,244,881 B2 | 8/2012 | Thornton et al. |
| 8,260,881 B1 | 9/2012 | Paleja et al. |
| 8,467,405 B2 | 6/2013 | Suzuki |
| 8,549,167 B2 | 10/2013 | Vonog et al. |
| 9,253,255 B2 | 2/2016 | Bosch et al. |
| 9,372,778 B1 | 6/2016 | Duquene et al. |
| 9,712,412 B2 | 7/2017 | Schlack et al. |
| 9,756,124 B1 | 9/2017 | Bosch et al. |
| 9,781,033 B2 * | 10/2017 | Shailendra ............ H04L 67/327 |
| 9,832,291 B2 | 11/2017 | Solis et al. |

(56) References Cited

U.S. PATENT DOCUMENTS

| | | | |
|---|---|---|---|
| 9,871,722 B2 | 1/2018 | Ou et al. |
| 9,948,550 B2 | 4/2018 | Ge et al. |
| 9,948,557 B2 | 4/2018 | Fan et al. |
| 9,960,999 B2 | 5/2018 | Azgin et al. |
| 10,158,570 B2 | 12/2018 | Moiseenko et al. |
| 10,313,415 B2 | 6/2019 | Surcouf et al. |
| 10,404,537 B2 | 9/2019 | Fox et al. |
| 10,440,161 B2 | 10/2019 | Solis et al. |
| 2002/0116594 A1 | 8/2002 | Cox |
| 2005/0182829 A1 | 8/2005 | King et al. |
| 2006/0256817 A1 | 11/2006 | Durst |
| 2009/0282159 A1 | 11/2009 | Wang et al. |
| 2009/0285209 A1 | 11/2009 | Stewart et al. |
| 2009/0287835 A1 | 11/2009 | Jacobson |
| 2009/0288163 A1 | 11/2009 | Jacobson et al. |
| 2010/0061369 A1 | 3/2010 | Suzuki |
| 2011/0252082 A1 | 10/2011 | Cobb et al. |
| 2011/0280216 A1 | 11/2011 | Li et al. |
| 2012/0331089 A1 | 12/2012 | Vonog |
| 2013/0041972 A1 | 2/2013 | Field et al. |
| 2013/0173822 A1 | 7/2013 | Hong et al. |
| 2013/0227166 A1 | 8/2013 | Ravindran et al. |
| 2013/0275544 A1 | 10/2013 | Westphal |
| 2014/0023072 A1* | 1/2014 | Lee | H04L 45/742 370/389 |
| 2014/0052812 A1 | 2/2014 | Ozawa |
| 2014/0082123 A1 | 3/2014 | Hasuo |
| 2014/0289325 A1 | 9/2014 | Solis |
| 2014/0310339 A1 | 10/2014 | Yong et al. |
| 2015/0248455 A1 | 9/2015 | Sevilla et al. |
| 2016/0021162 A1* | 1/2016 | Surcouf | H04N 21/238 709/219 |
| 2016/0036730 A1* | 2/2016 | Kutscher | H04L 41/083 370/401 |
| 2016/0119251 A1 | 4/2016 | Solis et al. |
| 2016/0234333 A1 | 8/2016 | Yeh et al. |
| 2016/0308823 A1* | 10/2016 | Maslak | H04L 61/2007 |
| 2016/0337426 A1 | 11/2016 | Shribman et al. |
| 2017/0134274 A1 | 5/2017 | Araújo |
| 2017/0201375 A1 | 7/2017 | Amin et al. |
| 2017/0277909 A1 | 9/2017 | Kraemer et al. |
| 2017/0302552 A1 | 10/2017 | Ward et al. |
| 2017/0302575 A1 | 10/2017 | Ward et al. |
| 2017/0302576 A1 | 10/2017 | Townsley et al. |
| 2017/0346788 A1 | 11/2017 | Jokela et al. |
| 2018/0103128 A1 | 4/2018 | Muscariello et al. |
| 2018/0241669 A1 | 8/2018 | Muscariello et al. |
| 2018/0241679 A1 | 8/2018 | Muscariello et al. |
| 2018/0242186 A1 | 8/2018 | Muscariello et al. |
| 2018/0242218 A1 | 8/2018 | Muscariello et al. |
| 2018/0367651 A1 | 12/2018 | Li et al. |
| 2019/0222619 A1 | 7/2019 | Shribman et al. |

OTHER PUBLICATIONS

Examination report dated Mar. 16, 2020 in application EP 17 733 142.8-1213 (11 Pages).

Examination report dated Mar. 16, 2020 in application EP 17 733 1.134.5-1213 (11 Pages).

Suman Srinivasan et al. "IPv6 Addresses as Content Names in Information-Centric Networking", Jun. 18, 2011 (Jun. 18, 2011), pp. 1-2, XP055404410, Columbia University, Retrieved from the Internet: URL:http://www.cs.columbia.edu/~hgs/papers/Srin1106_1Pv6.pdf.

Brian Field et al. "Integrating Routing with Content Delivery Networks", Computer Communications Workshops (Infocom Wkshps), 2012 IEEE Conference on, IEEE, Mar. 25, 2012 (Mar. 25, 2012), pp. 292-297, XP032175746, DOI: 10.1109/INFCOMW.2012.6193508; ISBN: 978-1-4673-1016-1 (6 pages).

Abhishek Chanda et al. "ContentFLow: Adding Content Primitives to Software Defined Networks", Globecom 2013—Next Generation Networking Symposium; 978-1-4799-1353-4 (7 Pages).

C. Westphal et al. "Adaptive Video Streaming over ICN", Internet Draft, draft-irtf-icnrg-videostreaming-07, Feb. 16, 2016, 40 pages.

\* cited by examiner

| Fields | IPv6 | Routing prefix + subnet id | Interface identifier |
|---|---|---|---|
| Bits | | 48 + 16 | 64 |

| Fields | Chunk Descriptor | | | | |
|---|---|---|---|---|---|
| | Stream Type | Service ID | Content Descriptor | | |
| Bits | 2 | 12 | 26 | | |
| | | | | 5 | 4 | 15 |
| Comments | = 4 types<br>00 = linear<br>01 = non-linear<br>10 = UGC<br>11 = corp. | = 4096 services per type | = 70+ millions per service | = 32 profiles<br>To combining appropriated AV formats and ABR qualities<br>=0 reserved value | = duration<br>From 1 to 15s<br>=0 can be reserved for non, so a single (big) chunk/file | = chunk sequence number<br>Allows by iteration to (pre)-fetch/cache over the network<br>Combined with Duration, it references from 6 hours to 4 days per service / content. It also gives direct time stamps for trick modes.<br>=0 can be reserved for the dash manifest |

| Fields | Show/Serie ID | Episode ID |
|---|---|---|
| Bits | 16 | 10 |
| Comment | =65000+ per service | =1000+ per show |
| Fields | Source ID | Movie ID |
| Bits | 12 | 14 |
| Comment | =4000+ per service | =16000+ per service |
| Fields | #Day | #Clock |
| Bits | 15 | 11 |
| Comment | year/month/day | minute in the day |

Fig. 9

CONTENT ROUTING IN AN IP NETWORK

TECHNICAL FIELD

The present disclosure relates generally to the application of content routing and networking principles in a network that is not a native content routing network, in particular an Internet Protocol (IP) network such as an IP version 6 (IPv6) network.

BACKGROUND

In a traditional IP network, addressing schemes have been established based on the nodes of the network such that individual network nodes have associated local or globally-unique addresses. In a content networking paradigm, addressing in the network is arranged around the information itself. Systems and methods described herein address problems arising from the interaction between IP and content networking models.

BRIEF DESCRIPTION OF THE FIGURES

Embodiments of the method and apparatus described herein are illustrated in the Figures in which:

FIG. 9 shows an example of a structure of an IPv6 address;

DETAILED DESCRIPTION

Overview

Figure 1:
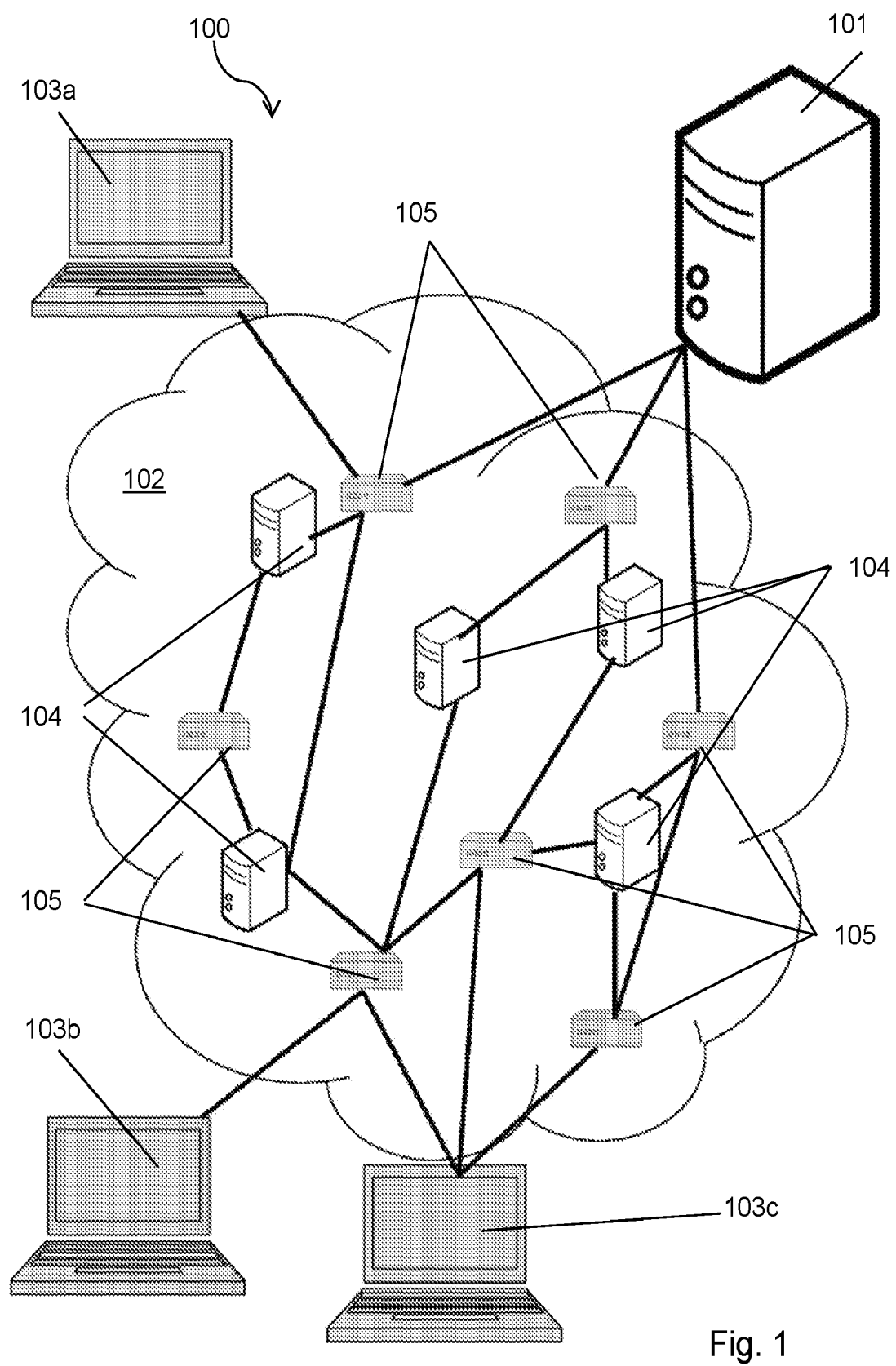
FIG. 1 shows an overview of a network in which embodiments may be implemented.

Aspects of the invention are set out in the independent claims and preferred features are set out in the dependent claims. The aspects may be implemented in conjunction with one another and preferred features of one aspect may be applied to other aspects.

Described herein is a method of routing a packet in a network comprising a plurality of nodes implementing Information Centric Networking (ICN) routing or content centric networking and routing. The method includes receiving the packet at a node implementing ICN routing, the packet comprising an Internet Protocol (IP) header and a packet payload, wherein the packet comprises a request packet for requesting content from the network. The method further includes extracting from the packet payload a content identifier for the requested content and forwarding the packet to a next hop node in the network based on the content identifier extracted from the packet payload.

Also described herein is a method of delivering content in a plurality of packets over a network, wherein each packet comprises an Internet Protocol version 6 (IPv6) header. The method includes routing each packet from the packet source to a network element, the network element comprising an Information-Centric Networking (ICN) application, using IPv6 based on the IPv6 header. The method also includes managing transport layer functionality using the ICN application.

Apparatus for implementing the methods, including network nodes, computer programs, computer program products, computer readable media and logic encoded on tangible media for implementing the method are also described.

Networks such as local area networks and wide area networks can be implemented between nodes or network devices and are often utilised for distributing data for storage within the network device and for later retrieval of that data. One example of a wide area network is the internet. Nodes of the network may request data from one another. They can do this in one of two ways they can either address a request to another node, the request including details of the data being requested, or they can address a request directly to the required data.

The network forming the internet is made up of a large number of interconnected nodes. These nodes include clients, switches, servers, routers and other such devices and the nodes can communicate using many different protocols at different layers of the OSI model, but in particular the Internet Protocol version 4 (IPv4) communications protocol. Nodes in the network can be addressed using static or dynamic IPv4 addresses, some of which are globally-reachable but many of which are specific to a local network segment.

Internet Protocol version 6 (IPv6) has greatly increased the number of available Internet Protocol (IP) addresses, enabling IP addresses to be utilised in a different way. IPv6 addresses contain 128 bits and the number of unique IPv6 addresses is therefore significantly greater than for 32-bit IPv4 addresses. This means that content, in addition to nodes, can have an IP address; in fact each data item, whether it is a page, article or piece of multimedia content can have its own IP address. This means that rather than traffic being addressed to a specific node, traffic can now be alternatively or additionally addressed to a particular piece of content.

FIG. 1 shows a standard network configuration 100 with clients (or consumers, or users) 103a-c, a main server 101, routers 105 and caches 104. Note that identical numbering has been used for features which are functionally equivalent to one another, e.g. all the caches 104, and all the routers 105. This should be interpreted as meaning that each cache has broadly the same functionality as each other cache, although the exact content stored on each, and the technical capabilities of each may vary. Similarly, each router 105 is arranged to operate in broadly the same way as each other router, and importantly they are all interoperable with each other, but specific functioning and capabilities may vary between routers.

Figure 2:
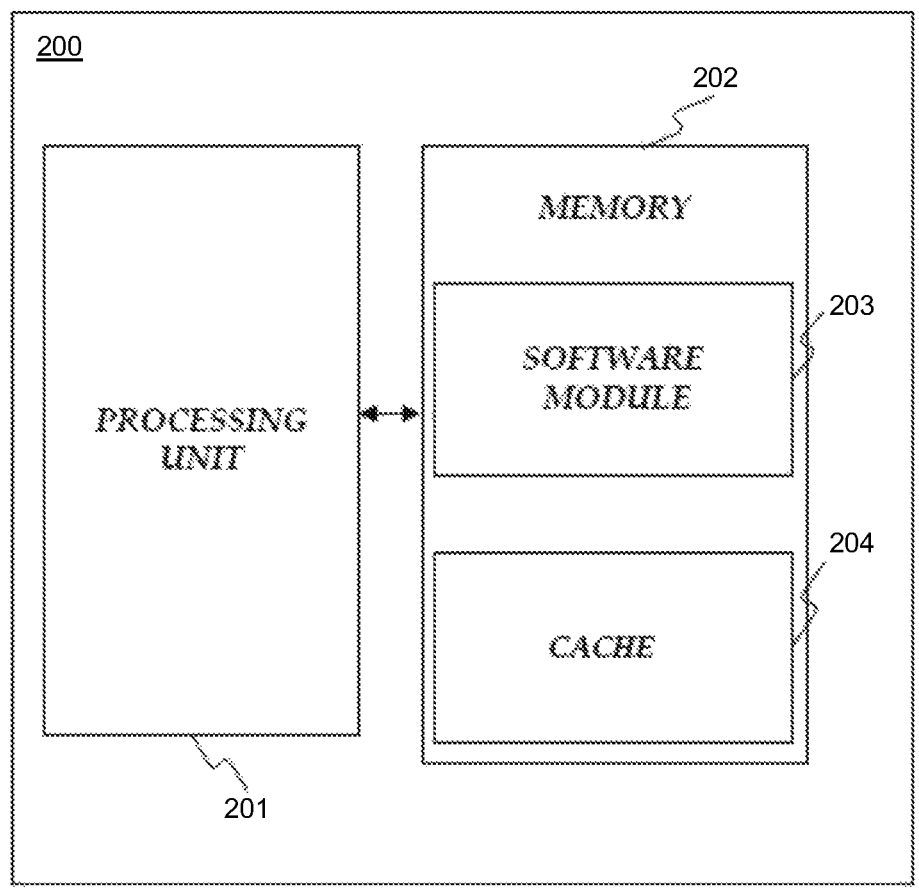
FIG. 2 shows a block diagram representative of a router or server.

FIG. 2 shows a block diagram of a server. The server has within it a cache memory that is used to store content that can be accessed by other nodes on the network. This memory is assigned by several algorithms, most commonly the content most recently requested by one of the end point nodes is stored. FIG. 1 shows these endpoint nodes, which can receive data from a number of servers. If an end point node requests content the server will check its cache to see if it has the content stored; if it does not, it will redirect the request to another node. For example it may redirect the request to a central node that is the provider of the content.

In particular, FIG. 1 shows clients 103a-c and illustrates how they can receive data over a network 102, which could be the internet, for example. A request from a client 103 is forwarded to a cache 104, based on known routing policies. If the cache 104 does not have the exact content requested, it can either redirect the request to another node, for example it may redirect the request to a main server 101 that is the provider of the content.

Typically, routing is performed using Internet Protocol (IP) addresses. The IP version currently in use is IPv4, which uses 32 bits to provide a unique address to every node on a network. This provides a little over 4 billion addresses, and it has been recognised for some time that the rate of growth of the internet is quickly rendering this number inadequate. To solve this problem, a new version of the Internet Protocol has been developed. This new version, IPv6, uses 128 bit addresses, allowing a total of around 3.4×1038 addresses.

A server usually serves a plurality of endpoint nodes across the network as is shown in FIG. 1. This means that the server may have to deal with multiple requests at the same time. If these requests together ask for more resources than the server or network (e.g. network bandwidth) can provide, then load balancing may be required. Load balancing is where traffic from nodes is redirected and distributed across a group of servers so that the requests can be fulfilled. It may also be the case that the requests cannot be fulfilled. For example many nodes may request a high quality of multimedia content and it may not be possible to deliver this simultaneously to all of the nodes. Therefore an inferior level of content may be delivered to at least some of the nodes in order not to overload the network but nevertheless still transmit the content (albeit at a lower quality than requested) to the nodes.

IPv6

IPv6 is an updated version of the internet protocol and is intended to replace IPv4. IPv4 and IPv6 are not designed to be interoperable. IPv6 uses a 128 bit address and these addresses are represented by eight groups of four hexadecimal digits.

IPv6 networks provide auto-configuration capabilities, enabling automatic assignment of an IP address to a device for example based on the device's Media Access Control (MAC) address. IPv6 networks are simpler, flatter and more manageable, especially for large installations. Direct addressing of nodes from anywhere in the network is possible due to the vast IPv6 address space, which enable the use of globally-unique addresses, and the need for network address translation (NAT) devices is effectively eliminated An IPv6 address is designed to consist of two parts, a 64 bit prefix that is used for routing and a 64 bit interface identifier. The interface identifier was originally designed to identify a host's network interface, for example by using a hardware address such as the MAC address of the interface. However it has been appreciated that the interface identifier does not have to be used for this purpose. To this end some embodiments described herein utilise the interface identifier to identify content instead. Therefore content will have its own IP address. This means that instead of routing to a particular node in the network, traffic will route to specific content. Large data files such as streams of media content, are often divided into chunks or segments of data as described below and, in this case, each chunk will preferably have its own address.

Figure 4A:
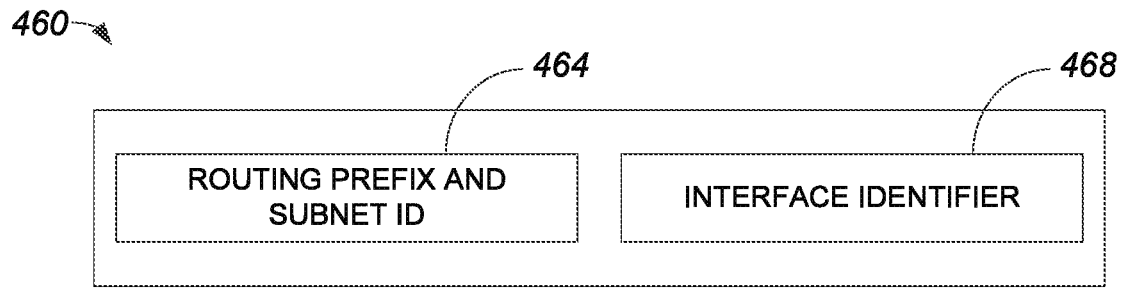
FIGS. 4A and 4B show diagrammatic representations of an IPv6 address in accordance with several embodiments.

FIG. 4A is a diagrammatic representation of an IPv6 address that may be part of a segment list in a segment routing header or extracted from a message payload in accordance with an embodiment. An IPv6 address 460 may include bits, e.g., 128 bits, substantially divided into a routing prefix and subnet identifier (ID) 464 and an interface identifier 468. In one embodiment, routing prefix and subnet ID 464 includes approximately 64-bits, and interface identifier 468 includes approximately 64-bits, but a larger or smaller number of bits may be used for each identifier An overall content description may be included in, e.g., coded in, interface identifier 468.

Interface identifier 468 will be described with respect to FIG. 4B in accordance with an embodiment. Interface identifier 468 may include, as shown, a stream type 470a, a service identifier (ID) 470b, a content descriptor 470c, and a chunk descriptor 470d. It should be appreciated that the number of bits included in interface identifier 468 may vary widely, and the number of bits allocated to stream type 470a, service ID 470b, content descriptor 479c, and chunk descriptor 470d may also vary widely, By way of example, interface identifier 468 may include approximately 64-bits, while stream type 470a may include 2-bits, service ID 470b may include 12-bits, content descriptor 470c may include 26-bits, and chunk descriptor 470d may include 24-bits.

Stream type 470a may describe a type of stream, e.g., a type of video stream. Types of streams may generally include, but are not limited to including, linear content such as television or live video content, non-linear content such as video-on-demand, user generated content (UGC), and corporate audio/visual content such as telepresence content.

Service ID 470b may identify service from any source, as for example a provider, an operator, and/or a channel. It should be understood that each source may generally have more than one service ID 470b. In one embodiment, when service ID 470b includes 12-bits, there may be up to approximately 4096 values for service ID 470b that correspond to each stream type 470a.

Content descriptor 470c may generally allow for the management and the identification of content associated with each value of service ID 470b. Examples of a suitable content descriptor 470c will be discussed below with respect to FIGS. 5A-C.

Chunk descriptor 470d is arranged to describe naming conventions for segments which make up, e.g., constitute, content such as a chunk of video. As will be understood by those skilled in the art, chunk descriptor 470d describes naming conventions for segments which make up content. In general, chunk descriptor 470d also facilitates the implementation of caching strategies such as automatic predictive caching. Chunk descriptor 470d may have approximately the same structure as content descriptor 470c, although chunk descriptor 470d and content descriptor 470c generally include different, substantially independent, information. One example of a suitable content descriptor 470c will be described below with reference to FIG. 6.

Figure 5A:
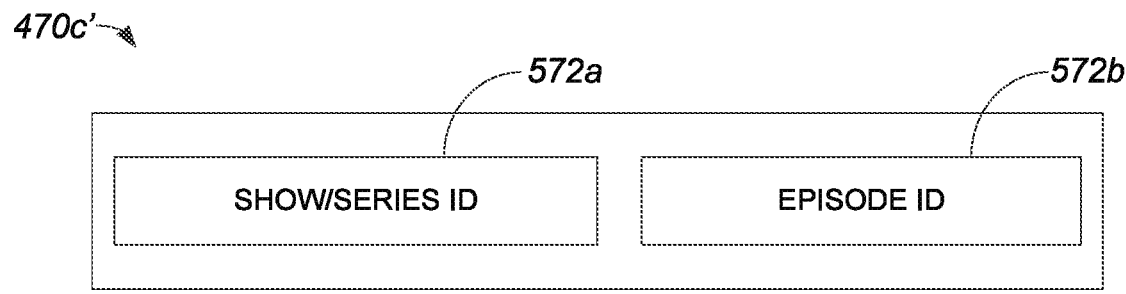
FIGS. 5A-C show diagrammatic representations of suitable content descriptions in accordance with embodiments of the present disclosure.
Figure 5B:
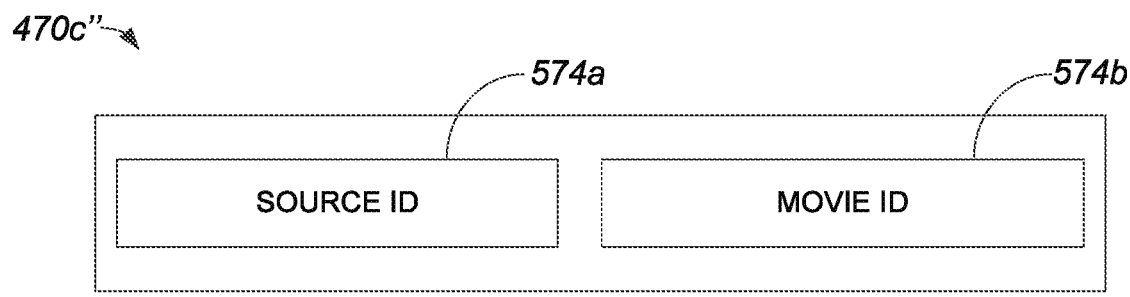
Figure 5C:
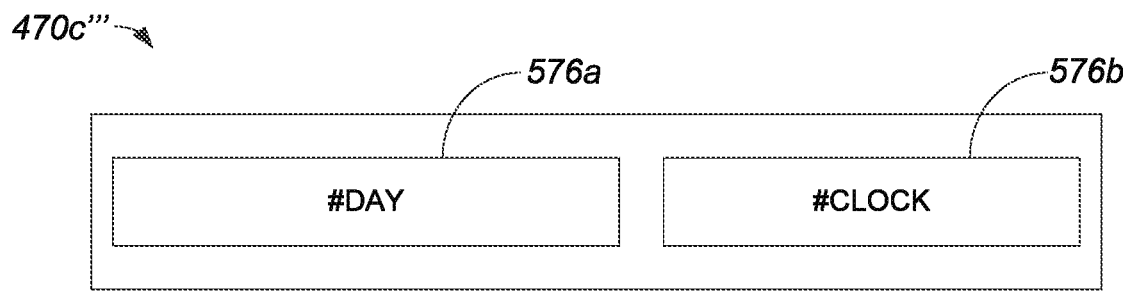

Referring next to FIGS. 5A-C, examples of suitable content descriptors 470c will be described. Using IPv6 address bits as a content descriptor effectively exposes significant properties of content to lower level layers of a network, and may also facilitate the implementation of caching strategies such as automatic predictive caching.

Figure 4B:
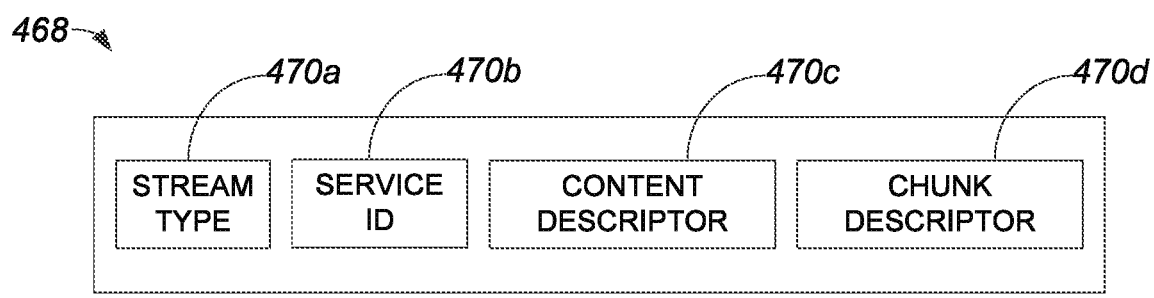

FIG. 5A is a diagrammatic representation of a first suitable content description, e.g., content descriptor 470c of FIG. 4B, in accordance with an embodiment. When content is associated with shows or series associated with a service or channel ID, bits of a first content descriptor 470c' may include a show or series identifier (ID) 572a and an episode ID 572b. The number of bits associated with show or series ID 572a and episode ID 572b may vary widely. In one embodiment, show or series ID 572a may include approximately 16-bits and episode ID 572b may include approximately 10-bits.

When content is associated with movies, a content descriptor 470c" may include a source identifier (ID) 574a and a movie identifier (ID) 574b, as shown in FIG. 5B. In one embodiment, source ID 574 may include approximately 12-bits and movie ID may include approximately 14-bits.

FIG. 5C is a diagrammatic representation of a third suitable content descriptor in accordance with an embodiment. A content descriptor 470c'" may be suitable for managing a flow per minute in a day. Content descriptor 470c'" may include a #day 576a and a #clock 576b. #day 576a identifies a number of days starting from a fixed date, e.g., a conventional fixed date, and #clock 576b identifies a time. In the described embodiment, #day 576a includes approximately 15-bits and #clock 576b includes approximately 11-bits. As #day 576a generally identifies a number of days starting from a fixed date, #day 576a effectively enables an actual date to be determined.

Mapping Database

One node (or distributed system) that may be provided in networks described herein is a mapping database, such as a Domain Name System, DNS. The DNS is a decentralised naming system for nodes connected to the internet. It is used to associate URLs or domain names with IPv4 addresses. DNS can be implemented to work the same way with IPv6, however now it can also associate content, or a combination of content name and URL with an IPv6 address.

The skilled person will appreciate, however, that other mapping databases may be used to implement the methods described herein. A mapping database will typically map a device or content identifier (which may be a text-based identifier of the device or content such as a URL) to an address identifiable in a network (typically a numerical address for the device or content, such as an IPv4 or IPv6 address). As described herein, the address returned by the mapping database may uniquely identify the location of the device or content or may point towards the device or content location (for example, as in segment routing). The address returned may therefore be a complete address associated with the content or device or may be a partial address, such as an IP address including a number of default generic fields.

Segment Routing

One alternative way of requesting content in an IPv6 network is to use segment routing. Segment Routing (SR) allows an IPv6 or Multiprotocol Label Switching (MPLS) packet header to encode a list of explicit waypoints, e.g., multiple nodes, rather than a single destination. Such waypoints may be used to route packets through a specific service or application. Accessing a particular service hosted on any one of a list of servers, however, is time-consuming and inefficient.

Common content streaming systems typically utilize web protocols, as for example a hypertext transport protocol (HTTP), that operates at substantially all application layers. As common content streaming systems rely on Domain Name Service (DNS) and HTTP, Transmission Control Protocol (TCP), and/or Internet Protocol (IP), technical tradeoffs and limitations may result in compromising the quality of streaming content. Common content streaming systems include, but are not limited to including, video streaming systems and audio streaming systems.

Segment Routing (SR) protocol architectures generally provide a tool to help search for content among multiple nodes or networks. In conjunction with the data-centric networking methods described herein, SR allows a shift from substantially centralized delivery of streaming video and single-point fetching to a data-centric object fetch approach at an inter-networking layer. As a result, more efficient streaming systems may be designed.

The general concept of Segment Routing is to allow a set of waypoints to be defined, and as a request traverses the network, a specific function is implemented at that waypoint. To give a specific example, a segment routing request may comprise a series of addresses, and the packet traverses the network, arriving at each address in order (in contrast to the usual shortest, or lowest latency route). One of the addresses may be an address for fetching the requested piece of content, and this is the final destination (e.g. the final address may be an address directly to content, as described herein). Other addresses specify waypoints along the route, at which various functions may be applied, for example service based or topological instructions. Thus Segment Routing v6 enables multiple functions one of which is hunting for directly addressed content.

When SR is used to enable content stored on servers to be provided to a client, a search for the best place to open a connection is conducted, and then a connection may be opened at that place so that a network may handle the process of accessing the content.

SR allows an IPv6 or Multiprotocol Label Switching (MPLS) packet header to encode a list of explicit waypoints, e.g., SR nodes, rather than a single destination. Such waypoints or SR nodes may be used to route packets through a specific service or application. For example, SR may route packets to or through a specific aspect of an application and/or a service as long as that specific aspect may be uniquely numbered and represented by an explicit waypoint such as an SR node. An aspect may be, but is not limited to being, a uniquely identifiable chunk of data in a content caching or video delivery application.

Some systems allow IPv6 SR to be used to search for or otherwise hunt for a particular piece of content or service which may reside on substantially any SR-capable waypoint or node running an application that will provide the piece of content or service. Such systems typically rely upon the ability of an SR-capable node to intercept a packet at an intermediate waypoint during a session on the way to a final destination in an SR list. In addition, subsequent packets may reach the same intermediate waypoint without being intercepted by any other waypoints for the life of the session.

In one embodiment, a new mechanism that enables a client to access a service hosted on a list of servers referenced in an SR list is provided. In another embodiment, servers are substantially auto-selected without a client noticing which server has accepted a connection request. SR is used to allow a server selection process to be more automatic and transparent to a client or an endpoint requesting a service.

Specific IPv6 addresses are searched for, or hunted for, along a path of specified IPv6 addresses in an SR list. When a match is found to a specific IP address, the match may correspond to either an application that will result in an instantiation of a new TCP session on a particular node from the SR list, or may be associated with an already existing TCP session. An initial TCP packet may have a different SR list than a subsequent reply and packets thereafter. The ability to direct traffic to a node with a TCP session may be provided in a way that does not require modifications to existing TCP stacks. An IPv6 stack may provide proper primitives to essentially support load balancing of a stateful session such as a TCP session across a set of nodes as defined by an IPv6 SR list. In this example, TCP is an example of a suitable protocol. There are many other connection oriented transport protocols that could be used in place of the commonly used TCP.

A node in the system may be configured to send a packet with a segment routing header populated with the list of addresses attached to the chunk entry from the video description. The packet then goes along the path set by all these segments, and if at any point in the path one of the routers (network endpoints) has the requested chunk, it can terminate the traffic and send the chunk back to the client device. The router therefore may be able to intercept and interpret the packet to detect whether or not it has the requested chunk.

The router may maintain an additional table that represents the "chunk table". When a packet as described above arrives, the router performs a lookup on the chunk table with the last address from the SR list. If there is a match meaning that the chunk is present, the router can terminate the traffic and sends the chunk back to the client. Otherwise, it sends the packet to the next segment in the list. It is not mandatory for a router having the requested chunk to terminate the traffic, this decision can be driven be other considerations such as current workload or other network considerations.

IPv6 SR may also be used for building path-aware geolocation into the routing system. This may allow routers to serve content based on where the content lies, and where the paths content traverses, with the ability to reroute dynamically while including crossing of political and geographical boundaries intact.

Storage and Retrieval of Media Content in a Network

Media content (both audio and video) can be divided into chunks or segments for both storage in and delivery over a network. In that way, for example, media content that can be of many hours duration (such as a film or broadcast of a sporting event) can be divided into a number of segments of shorter playback time (such as between 30 seconds and 5 minutes).

When a network device, such as a client end user device, requests particular media content, such as a particular video file, it needs to obtain all of the chunks of data that make up that media content.

One way of streaming media content using chunking is to use a technique such as Dynamic Adaptive Streaming over HTTP (DASH), which allows adaptive bit rate streaming of media content, stored as chunks in a network one or more HTTP servers, to a network destination requesting the data.

Prior to storage, the media content is divided into shorter chunks or segments and alternative versions of each chunk are stored at various servers in the network. The alternative versions may be, for example, encoded at different bit rates or may have different formats for playback through a variety of different end user devices (Internet connected TVs, set top boxes, mobile devices including smartphones, laptops etc.)

When the content chunks are created, a DASH manifest file is also created, which identifies the chunks of data necessary to recreate the whole stream of media content, including details of alternative chunks (for example those that are encoded at different bit rates).

Separate DASH manifest files may be created for different formats or encodings of a particular stream of media content, such that a set top box would be working from a different DASH manifest to that used by a smartphone.

The DASH manifest typically also includes an indication of the location of each of the chunks. However, when dealing with consecutive or aggregate chunks, a manifest template can be used to group multiple chunks that follow a regular format into one description. This can enable easier parsing of the manifest file.

Based on the manifest, the end user device can retrieve and reconstruct the full media content at the highest bit rate currently available to it over the network. In particular, the end user device can obtain subsequent chunks identified in the manifest while decoding and displaying a current chunk.

DNS and Content Networking

The DNS is a highly scalable global distributed database for resolving a Fully Qualified Domain Name (FQDN) to a record containing information associated with the FQDN. The most common usage of the DNS is for obtaining A and AAAA records, which contain a single IPv4 or IPv6 address, respectively.

An IPv4 address can then be used to IP Route towards the particular host associated with that FQDN. The host referred to by the IP address, particularly in the case of video or other types of content delivery, is commonly a VIP (Virtual IP) address which, through a series of redirections (at the DNS level as well as layers above), ultimately reaches a server containing a process to serve the content requested as well as the content itself (though the content may in turn be on a file system that is further abstracted away). This system has built up over time, and contains a number of redirections, lookup tables, protocol formats, specialized equipment, etc. Some of these processes were designed due to the specific restrictions at the time. For example, IPv4 addresses are a constrained resource and parts of the DNS of decades past commonly operated under very high load given its serving capability at the time. The DNS system today is stressed far more by distributed denial of service attacks specifically attempting to take it down than the increased load in devices accessing it for legitimate purposes.

IPv6 Content Networking (6CN) operates by assigning a globally unique IPv6 address to content itself, and in the case of video to ABR chunks of data. It can be assumed that the addressing follows a model that allows for IP CIDR longest match aggregate prefixes corresponding chunks of data that would normally be accessed or stored in sequential (or at least predictable) address blocks. Further, the addressing may refer to an actual piece of content, or content with a particular function applied (such as JIT Transcoding of video, decompression, encryption, etc.).

6CN assumes that a Packager is preprocessing all content, possibly into ABR chunks, and in doing can assign a unique identifier. When that unique identifier is an IPv6 address, it fits the underlying IP routing systems such that it can be directly routed directly to it rather than subject multiple layers to full processing of the URI. A request to access a single chunk of data with http may look like this:
http://[2001:DB8:1234:5678:9ABC:DEF0:1234:5678]

Alternatively, if DNS is used it may look like this:
http://gameofthrones-s03e04-1024-xxxx.hbo Where xxxx points to a specific chunk within the 1024 encoding of episode 4, season 3, of a popular series on hbo. Adding ".comcast" could be Comcast's encoding of that same piece of content prefaced by comcast's 6CN IPv6 prefix.

In the most basic sense, each IPv6 address corresponds to an AAAA record stored in the DNS system. DNS is then being used to store the address to an individual content chunk that can be routed directly in the IPv6 system. In terms of scale, one could compare extending the DNS to 100B "IoT" end points in much the same way as extending it to 100B content assets.

DNS is a hierarchical caching system, and includes the ability to cache results locally on the client making the DNS request, or nearby in, say, a home router, etc.

As an additional optimization, specifically for the case of sequentially (or predictable) name and address pairs, we define the ability to associate a rule for determining "future" names and IPv6 addresses subject to a given deterministic mapping.

For example:
"got-s03e04-1024-xxxx.hbo" [2001:DB8:1234:5678: 9ABC:DEF0:1234:xxxx]

Where xxxx is a hexadecimal number in the IPv6 address and associated string in the DNS name.

Resolving "0001" as a suffix of the FQDN will refer to :0001 in the IPv6 address if the DNS system is directly queried. Any DNS system or cache (including local to the client, or within the video player) understanding this convention may then infer than 0002 will refer to :0002, etc.

Information about the content can also be encoded into the IPv6/6CN address, for example information about the length of the chunk, the encoding and the formatting.

An additional record (for example, a TXT record) may be assigned alongside the AAAA record in the DNS for carrying associated parameters for the mapping algorithm. Alternatively, a specific record may be returned (TXT or otherwise) using a domain name but omitting the host portion. E.g, "hbo" vs. <content id>.hbo. Finally, the name itself may simply follow a known convention agreed upon by the client software and the entity inserting the records into the DNS or managing the DNS servers for the content system.

There are six stages to implementing the 6CN content networking. The use of the DNS in the first three of these phases is described below.

In "Phase 1" of 6CN, there is a Content Placement system in charge of placement of content at the proper location at the proper time based on past, current, and predicted utilization patterns, policies, etc. DNS and content placement may be in the same system. This system collects analytics and telemetry from the IPv6 network as well as any video/content servers, clients, etc. The Content Placement system makes a global decision of where to push content, and includes that within the IPv6 address being returned by DNS. Thus the IPv6 address includes the particular Cache that can service the content within the Provider network.

It is expected that the DNS server will dynamically generate (i.e., the FQDN of the content doesn't change) the correct AAAA record depending on the location of cached content as well as to perform load balancing, migration of traffic, etc. This can also be a function of policy (e.g., business contracts allowing access to some cached content but not others).

When changing the IPv6 address dynamically for cache direction, it may be preferable to perform a DNS 301 or 302 redirect. Setting the cache TTL to 0 will avoid caching of old values as well. These techniques are necessary to combat propagation delays in the DNS system that may become problematic when using a highly dynamic address.

In "Phase 2" of 6CN, the DNS is still used to obtain a content address, but the cache location is not dictated by the DNS. This requires less integration between the Content Placement system and the DNS.

Reducing the integration of the centralized Content Placement system with the DNS system is an important point as it allows a client to use any DNS resolver without a redirect to a specific resolver, the need for TTL 0 records or issues with propagation of record updates and local or transparent caching. That is, in the present embodiment, the DNS and the content placement system are implemented as separate and independent elements of the network which may coordinate closely to provide services to the network.

Content IPv6 addresses are returned from the DNS as Anycast addresses. The Anycast address is routed within the network, and caching servers update the routing system accordingly when they decide (either centrally or locally) to cache content. Advertising an anycast route to the content will attract traffic according to the IP routing policy, including ECMP for load-balancing, failover, etc.

IPv6 address format may be returned from the DNS when the specific cache location is not handled by the DNS and the IPv6 address is an Anycast address.

In the 3rd Phase of 6CN, Segment Routing is used to provide an engineered path to "hunt" for a specific content ID.

"CDN Prefix" are simply possible locations for where the Content ID might be found. The DNS is used to return all an assortment of records. One example of which is a text record containing a string which could be a TXT record, in particular a DNS TXT record. This may be used to store a list of ordered addresses for use by IPv6 Segment Routing.

Alternatively, this may be done via an RR Type 42 (RFC3123) which is specifically an ordered list of prefixes. This list of prefixes is listed as Experimental, but is well supported in popular DNS server implementations.

In addition to being an ordered list, Type 42 is a prefix with a prefix length rather than an address as in a AAAA record. This prefix length could be used to indicate the point between an address chunk and its canonical aggregate.

The DNS can be an (entertainment identifier registry) EIDR to IPv6 repository by entering the values directly into the DNS, or by providing a proxy function between the EIDR gateway and a DNS server.

The DNS provides Domain Name System Security Extensions (DNSSEC). Putting the content ID into DNS (as the FQDN and the IPv6 address itself) enables cryptographic verification with this global system that indeed the mapping is correct. With a URI, the system can rely on SSL, but that's a much more loose certification hierarchy and, if a packet ends up being encrypted, it is lost to the network layer for packets in transit but also to the DNS system for associated analytics on content access (which can also impact into the centralized Content Placement system).

Information Centric Networking (ICN)

Information Centric Networking (ICN) provides a network paradigm in which the data or information in the network forms the basis around which information is distributed and routed within the network.

Each chunk of content has an individual ICN name, which is usually largely human-readable, for example cisco.com/newsitem1.txt/chunk1. An ICN network routes data and requests for that data based on the ICN name. In particular, data chunks are requested by name by ICN applications in content requests or interest packets. Routing techniques, in particular hierarchical routing techniques such as longest-prefix matching, are then applied in order to locate and retrieve the content. A whole item of content is obtained by requesting all of the chunks that make up that content and a list of the relevant chunks can be obtained from a manifest file or data file listing the relevant chunk names. Sometimes an intelligent ICN application can predict multiple chunk names based on a name of a single chunk, for example cisco.com/newsitem1.txt/chunk2 might follow cisco.com/newsitem1.txt/chunk1.

Reverse path information can be inserted into the request or interest packet on its route to the content so that the network knows how to route the data back though the network to the requesting device. More commonly, however, reverse path information can be stored in the nodes on the outbound path in a technique that can be termed "breadcrumb" routing, so that the content can follow the breadcrumb trail of small data packets left in the outbound network devices, to get back to the requesting network device.

Chunks of data are commonly cached in intermediate nodes on the way back through the network. These data chunks can be served directly from those caches in order to serve later requests.

As described in more detail below, ICN applications can control the rate at which requests for data are sent, hence adjusting the sending rate of the content chunks to enable congestion control. In this way, receiver driven transport protocols can be implemented, which are driven by the device requesting and receiving the content. An ICN transport protocol can also further segment the chunks to enable transmission over the network as necessary.

Internet-layer protocols such as IPv4 and IPv6 are not directly relevant to the implementation of a pure ICN network, but they are sometimes present in the network, in particular as an underlay for example on top of point-to-point UDP tunnels.

It is further noted that, although requesting nodes may implement ICN applications, according to some embodiments, content can be routed back to requesting nodes using a source address extracted from the request packet using standard routing mechanisms, rather than ICN reverse path mechanisms.

Phase 4

In a network in which items of content or data are addressed directly using IPv6 addresses, such that each chunk of data has its own IP address, many data requests (interest packets) need to be made to enable an end node to retrieve the complete data it requires, for example a whole piece of media content such as a movie.

In a traditional IPv6 network, once the data is located, a transport layer protocol, such as the Transmission Control Protocol (TCP) is used over the top of the IPv6 internet layer to ensure reliable delivery of the data from its storage location to the requesting end node. A TCP connection, or other transport layer connection must be implemented to enable delivery of each item of content and the network components themselves usually govern the selection and implementation of the transport layer protocol.

However, in an IPv6 network implementing content addressing, the number of TCP connections required in order to deliver the multiple chunks of content can stress the TCP capabilities of the network and delay content delivery. Layer 4 TCP becomes a bottleneck in content delivery.

Therefore, in one embodiment, the network is implemented using an IPv6 routing method, such as any one of those described above, but the transport layer mechanism of the network is replaced with an Information-Centric Networking (ICN) transport layer or a transport layer selected, implemented and managed by the ICN application.

The ICN transport layer is implemented and managed using an ICN application running on one or more network nodes, in particular on the node requesting the content, but the application may additionally, or in some embodiments alternatively, run on intermediate network nodes, such as an edge router cache or content server.

The ICN application can select an appropriate transport layer protocol to use based on the type of content, the network over which the content is to be delivered and/or the capabilities or preferences of the source and destination nodes. Certain content, for example video content, may require a transport protocol with a different level of reliability than other types of content, for example data content. Typical transport layers would include TCP, variants of TCP, SCTP and QUIC One suitable transport layer protocol for use in such a hybrid IPv6/ICN network is one in which the receiver controls the speed at which data is requested from the network, thus managing congestion in the network and also handling requests for retransmission based on the data received.

The ICN application can package the content with the transport layer headers already attached inside the content packages. The delivery network will not then need to apply its own transport layer headers but can simply route the packets through the network.

Caching can also be handled and managed in the network by an ICN application. Content chunks can be cached into intermediate network nodes along the delivery path. Further requests for the same content can then be intercepted using intelligence in the ICN application and the content can be served out of the cache rather than the request being routed all the way to the server that stores the "original" copy of the content.

Phase 5

In a further development of embodiments of the system described above, multiple nodes in the network implement Information Centric Network (ICN), however, there are still many network elements that do not include ICN applications. Therefore, in such networks, ICN source and destination nodes encapsulate the ICN data, and in particular ICN names, within IPv6 packets. It is noted that the ICN applications encapsulate into IPv6 rather than translating the ICN packet to an IPv6 packet.

In such an implementation, network elements that do not run ICN applications will route packets according to the IPv6 address and header. However, ICN applications can peek past the IPv6 layer into the packet payload and route based on the ICN name If no name is found in the packet payload, the ICN application can perform an ICN lookup, based for example on the IPv6 address in the header.

Hence, in this implementation, IPv6 headers are present for use by those network devices that do not implement ICN, but devices that include an ICN application can ignore the header and route based in information retrieved from the payload.

It is noted that, while particular advantages arise from the migration of an IPv6 network to ICN, it would be clear to the skilled person that elements of the systems described above would also enable the implementation of an ICN network over IPv4. The packet from which the packet payload is extracted may therefore be an IPv4 or an IPv6 packet with an IPv4 or IPv6 header.

In one embodiment, a segment routing stack or ordered list of addresses or address prefixes may be extracted from the packet header to enable segment routing to the content within a network that is able to implement segment routing, as described in more detail above.

Phase 6

In a further implementation, where the vast majority of applications are implementing native ICN, the network as a whole is native ICN and the IPv6 information can start to be removed from the packets, leaving a pure ICN network. In such an implementation, the presence or absence of an IPv6 header will start to become irrelevant and the step of encapsulation within an IPv6 packet can be phased out.

Signing of Data Packets

All of the embodiments described above can benefit from signing of data chunks. As Phase 5 is approached, this becomes more useful as the source IPv6 address on each packet and the IPv6 routing system itself is deprecated in exchange of reliance on a more dynamic routing system. The signing of data chunks then becomes the single source of truth for data packet integrity and authenticity.

Figure 3:
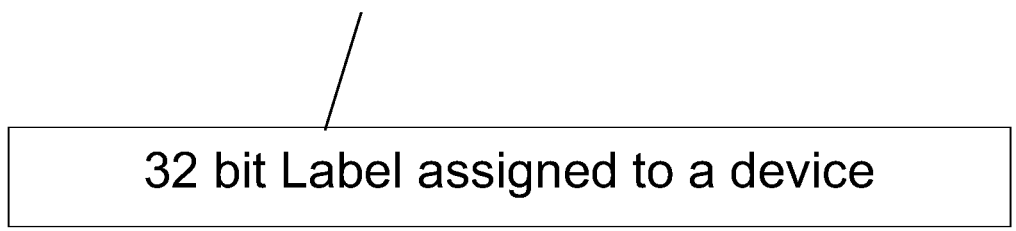
FIG. 3 shows a representation of an IPv4 header.

Turning the accompanying figures, FIG. 3 shows a representation of an IPv4 header. The 32 bits are used to describe a device location. This can be used as an address to navigate to such a device that may host content in an IPv4 network. It does not enable navigation to content directly.

Figure 6:
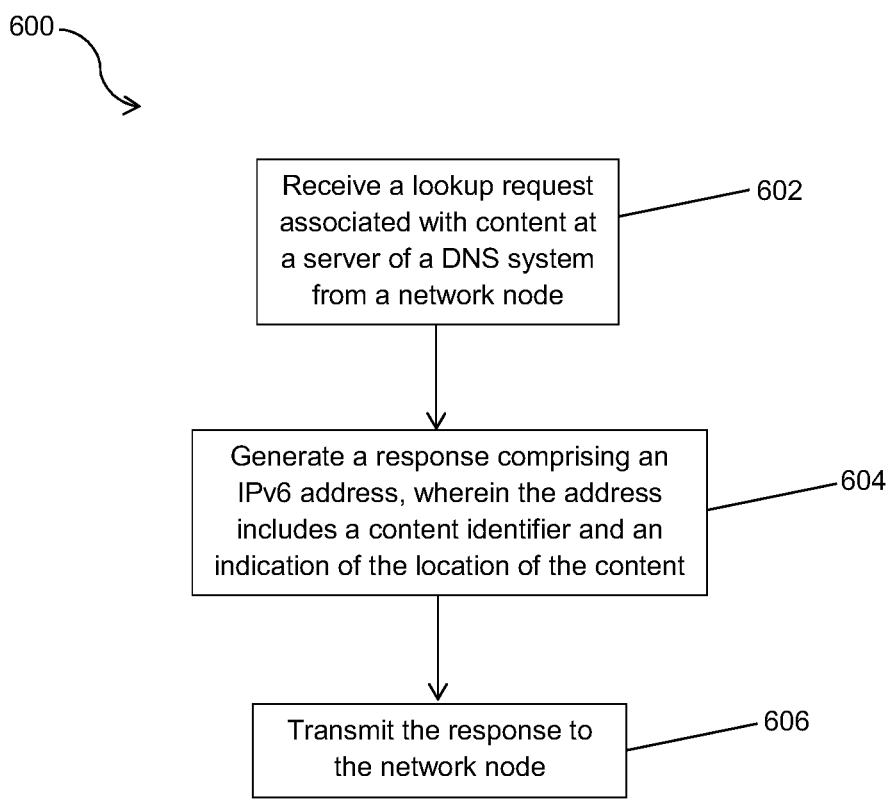
FIG. 6 shows a method according to one embodiment.

FIG. 6 is a flow diagram illustrating a method in which a server of a DNS system receives a lookup request associated with content from a network node (602). The server then generates a response comprising an IPv6 address, wherein the address includes a content identifier and an indication of the location of the content (604). The server then transmits this to the network node (606).

Figure 7:
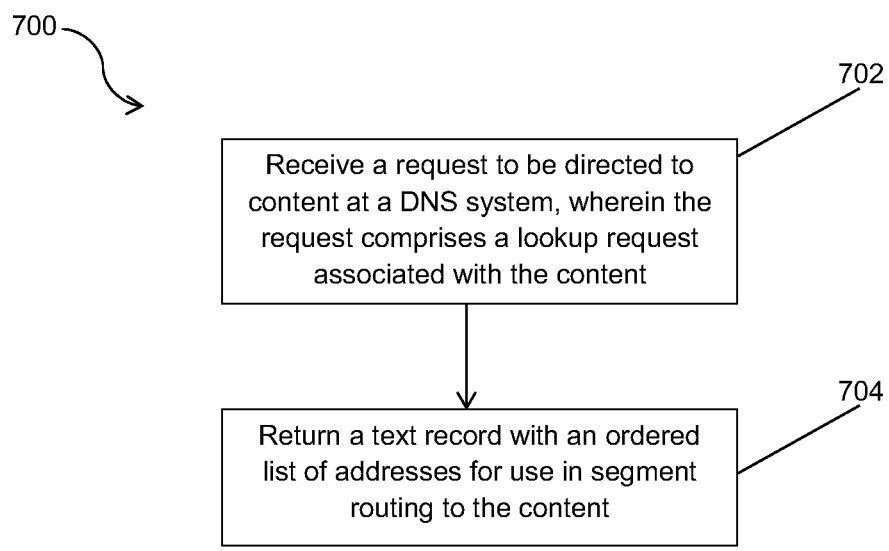
FIG. 7 shows a flow diagram of a method according to a further embodiment.

FIG. 7 is a flow diagram illustrating a method including receiving a request to be directed to content at a DNS system, wherein the request comprises a lookup request associated with the content (702) and then returning a text record with an ordered list of addresses for use in segment routing to the content (704).

Figure 8:
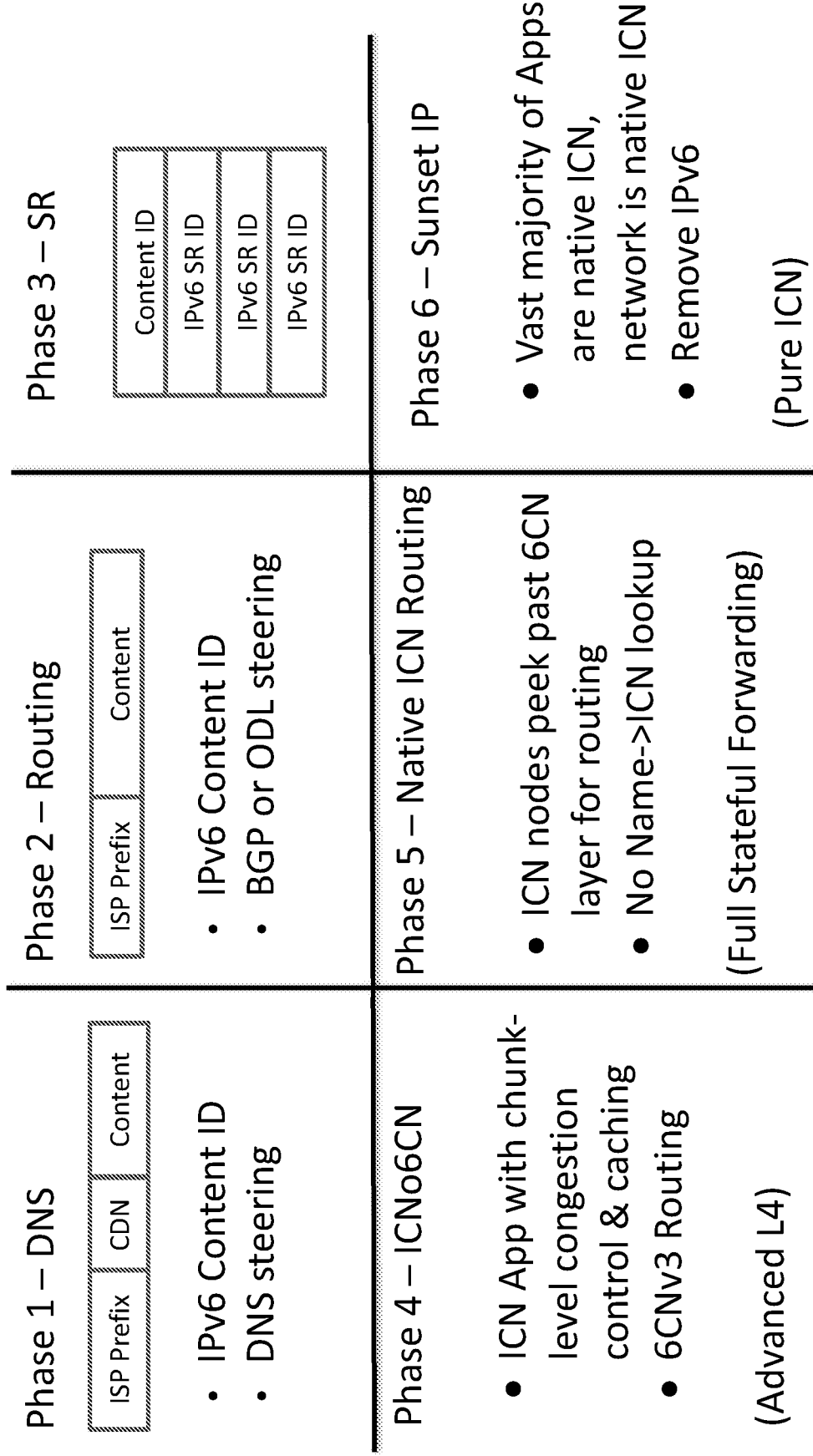
FIG. 8 is a schematic representation of a number of different network implementations.

FIG. 8 shows an overview of the 6 phases of implementing embodiments of the methods described herein. In this IPv6 addresses are used to address content as well as device addresses. This shows how from this use of IPv6 and then the use of 6CN a full implementation of ICN can be achieved over time. However, the phases need not all be implemented and need not be implemented in the order shown. In particular, phases can be skipped in particular implementations or a single phase may be implemented without reference to any other phase. Furthermore, aspects of the phases may be combined within a single network such that a particular implementation is not purely an implementation of a single phase.

FIG. 9 shows an example of the structure of a possible IPv6 address. It shows the interface identifier being used to describe chunks and content. The exact number of bits and data fields for each element shown can be varied and this is not intended to limit the disclosure in any way.

Figure 10:
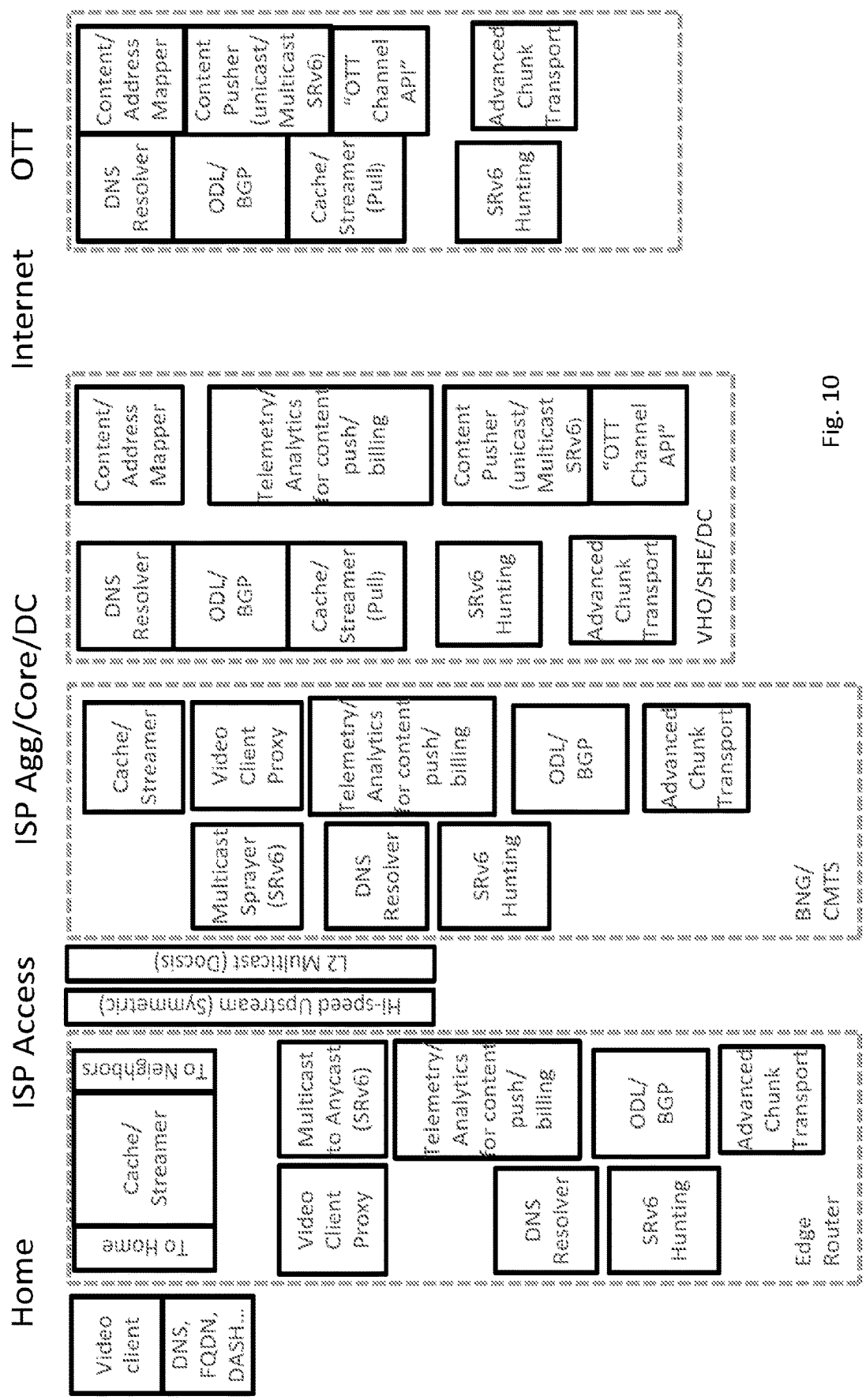
FIG. 10 shows a schematic for content delivery over the network.

FIG. 10 shows an example of an IPv6 enabled network, in which a user in a home receives content over the network from an OTT provider. While the figure shows an OTT provider as the origin of the content, the general principles described herein relate to the provision of content from any server on the network.

Briefly, the content provider supplies content via a network. In this example, the internet is used to distribute the content, but in other examples, any network may be used for content delivery. The content is then transmitted around the network by an internet service provider (ISP). Once the content is on the ISP at large, it can be delivered to consumers in the manner described in detail herein.

In particular, the final stage of the network prior to delivery to a user is an edge router. Once the user has requested data, it propagates through the network, to the edge router, which is usually the closest router of the network (geographically or topologically) to the location of the user. The edge router is typically tasked with authentication of both user and network content.

A particular feature of note is the portion of the edge router which connects to neighbours. For example, the edge router may link to other routers in the neighbourhood, or other geographically close vicinity, either as part of the network, or even in other homes. In this way content previously delivered to other network nodes can be supplied to a user very quickly, since it need not travel a large distance, so is less prone to the slowing effect of network traffic.

This arrangement is similar to existing Peer-to Peer (P2P) networking models. A key difference is the use of direct content addressing to determine the data stored at any given node. While P2P uses its own naming system, and each data chunk is only identifiable to specific users, the IPv6 model described herein allows any user to quickly and easily request, identify and obtain information over such a network.

Figure 11:
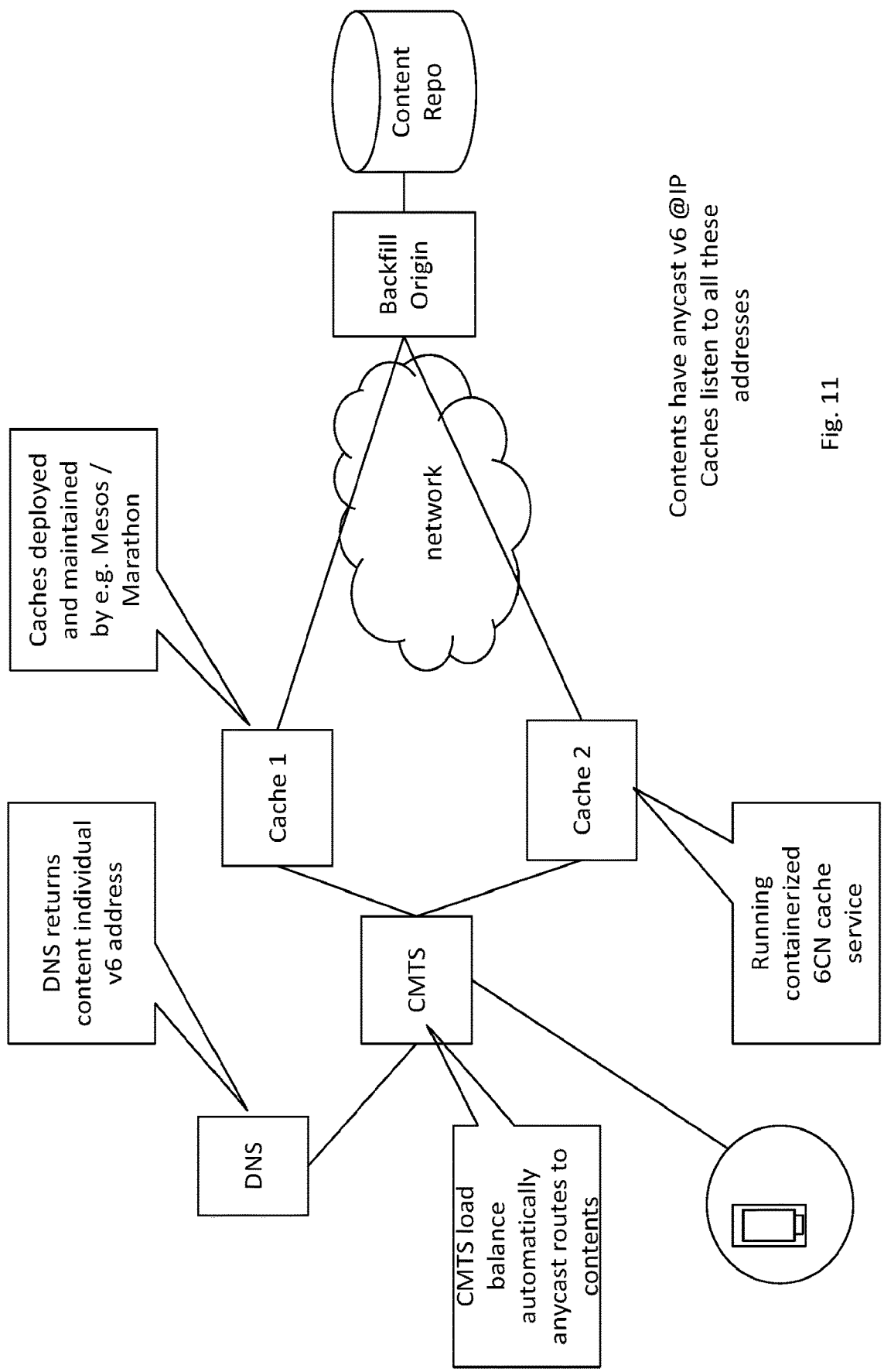
FIG. 11 shows an example of the use of 6CN.

FIG. 11 shows the use of the DNS in an IPv6 network. It shows a possible way in which the content from the caches are populated from content repositories and how load balancing may occur.

Network Telemetry

The use of IPv6 addresses as described above allows for improved network telemetry, because now the network can decipher additional information about the data from the IPv6 address. The network has information readily available on exactly which pieces of content are being delivered, where in the world they are being delivered, which device types are requesting the content, and in what format, all derived solely from the addresses being used. This can allow the network to intelligently populate its caches, using only address information of content which it is already delivering.

In addition, the increased information which is readily available to the network allows for improved security features to be implemented on the network, for example, since it is very simple to verify that the content requested by a user is the content which is eventually delivered to the user, because content can be directly and uniquely addressed.

Another use of the network telemetry can be in altering the network access available to a user, based on logs of the use. For example, since each request for data can directly reference content, a full record of the data accessed by a user, or supplied by the user is possible, potentially even all the way down to the chunk level. This is true even if the data is encrypted at levels 4 to 7 of the OSI model.

For example, if a particular piece of content proved to be extremely popular, then it will generate an above average amount of network traffic. The knock on effect of this may be that all users of the network find the network slow to respond. By keeping track of the users and/or information which cause this type of problem, the network can deal with this by, for example:

(a) ensuring that caching is performed efficiently and effectively, for example in a targeted way, as described above;
(b) restricting, reducing or preventing network access when problematic usage is attributable to the user; and/or
(c) altering the cost to a user for using the network for a period in which such actions are attributable to the user;
(d) providing additional, in particular targeted, network resources to overcome the problem.

Note that any of these actions can be pre-emptive, once a popular piece of content has been identified. Furthermore, while such actions are technically possible within implementations of the present system, it may not be desirable or in accordance with network policy to implement them in any particular network.

In this way, both content providers and content consumers can be provided with fair network access, based on the specific types of content which they consume or deliver. It can be simple for consumers to pay for content delivered to them, and for providers to ensure that consumers are charged only for the content they receive. Likewise, providers who take up an above average amount of network resources can be charged appropriately for the potential inconvenience experienced by other network users.

The present disclosure also envisages one or more computer programs, computer program products or logic encoded in computer-readable media for implementing any method claimed or described herein. It will be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

Throughout the description, references to components or nodes of the network should be construed broadly, and in particular may comprise several subcomponents or modules working in combination to achieve the stated effects. These subcomponents may themselves be implemented in hardware or software. Likewise, many different components may be combined together as one component, for example a single processor may carry out many functions simultaneously. Similarly, any reference to operational steps may comprise hardware, software, or a combination of the two. As already noted, any method described herein, or any part thereof may be carried out by a computer program, or a computer program product.

References herein to components being connected to one another should be interpreted as meaning either directly connected, or indirectly connected, for example being connected via other components. Indeed, in the case of complex networks, components may be both directly and indirectly connected to one another. Examples of such connection may commonly include, but are not limited to: electronic connections through wires or cables; fibre optic connections; and wireless communication, for example via radio waves, microwaves or infrared.

In the present disclosure, references to networks should be interpreted broadly. In particular, the internet is often used as an example of a network, but is not limiting. The principles set out herein are applicable to all networks, comprising a collection of processors connected to one another. Connection may be direct, or via switches and routers.

The network may further comprise servers and caches, depending on the exact nature of the network. When storage is discussed herein, this may include, without limitation one or more of magnetic, optical, solid state, volatile or non-volatile memory.

The steps associated with the methods of the present disclosure may vary. Steps may be added, removed, altered, combined, and reordered without departing from the scope of the present disclosure. Indeed, different aspects and embodiments of the disclosure herein may be combined with one another, in any combination and may be implemented in conjunction with one another in a particular network. In particular, individual components, and systems of components may be combined, the tasks of a single component divided between many subcomponents, or equivalent components interchanged without departing from the principles set out herein. Furthermore, features of one aspect may be applied to other aspects of the system.

Therefore, the present examples are to be considered as illustrative and not restrictive, and the examples are not to be limited to the details given herein, but may be modified within the scope of the appended claims.

The invention claimed is:

1. A method comprising:
   receiving a packet at a node of a plurality of nodes of a network, the node implementing Information Centric Networking (ICN) routing, the packet comprising an Internet Protocol (IP) header and a packet payload, wherein the packet comprises a request packet for requesting content from the network;
   extracting, by the node implementing the ICN routing from the packet payload, a content identifier for the requested content, wherein extracting the content identifier for the requested content by the node implementing the ICN routing comprises:
   ignoring, by the node implementing the ICN routing, the IP header of the packet, and
   extracting, by the node implementing the ICN routing, an unique ICN content name of the content from the packet payload of the packet, wherein the unique ICN content name of the content is encapsulated within the packet payload of the packet; and
   forwarding, by the node implementing the ICN routing, the packet to a next hop node in the network based on the unique ICN content name extracted from the packet payload.

2. The method according to claim 1, further comprising forwarding, by another node, the packet to another next hop node in the network based on the IP header if the unique ICN content name cannot be extracted from the packet payload.

3. The method according to claim 2, wherein forwarding based on the IP header comprises performing a lookup of the content identifier based on the IP header and forwarding the packet to the another next hop node in the network based on the content identifier.

4. The method according to claim 1, wherein the content identifier comprises an IPv6 address incorporating the unique ICN content name.

5. The method according to claim 1, wherein forwarding, by the node implementing the ICN routing, the packet to the next hop node comprises stateful forwarding.

6. The method according to claim 1, wherein the packet comprises an ICN packet encapsulated in the IP header.

7. The method according to claim 1, further comprising extracting from the packet payload or from a forwarding state within the network a list of ordered addresses.

8. The method according to claim 7, wherein the list of ordered addresses comprises a list of addresses for use in segment routing.

9. The method according to claim 7, further comprising forwarding the packet to the next hop node in the network based on the content identifier and on the list of ordered addresses.

10. An apparatus comprising:
    a memory; and
    a processor connected to the memory wherein the processor is configured to:
    receive a packet at a node of a plurality of nodes of a network, the node implementing Information Centric Networking (ICN) routing, the packet comprising an Internet Protocol (IP) header and a packet payload, extract, from the packet payload, a content identifier for the requested content, wherein the processor being operative to extract the content identifier for the requested content by the node implementing the ICN routing comprises the processor being operative to:
ignore the IP header of the packet, and
extract an unique ICN content name of the content from the packet payload of the packet, wherein the unique ICN content name of the content is encapsulated within the packet payload of the packet, and
forward the packet to a next hop node in the network via the interface based on the unique ICN content name extracted from the packet payload.

11. The apparatus according to claim 10, wherein the processor is further configured to extract, from the packet payload or from a forwarding state within the network, a list of ordered addresses and forward the packet to the next hop node in the network based on the content identifier and on the list of ordered addresses.

12. A method comprising:
routing a packet of a content from a packet source to a network element of a network comprising a plurality of nodes, the network element comprising an Information-Centric Networking (ICN) application, wherein routing the packet from the packet source to the first network element comprises:
receiving, at a node of the plurality of nodes of a network from the packet source, the node implementing an ICN routing, the packet comprising an Internet Protocol (IP) header and a packet payload;
extracting, by the node implementing the ICN routing from the packet payload, a content identifier for the content, wherein extracting the content identifier for the content by the node implementing the ICN routing comprises:
ignoring, by the node implementing the ICN routing, the IP header of the packet, and
extracting, by the node implementing the ICN routing, an unique ICN content name of the content from the packet payload of the packet, wherein the unique ICN content name of the content is encapsulated within the packet payload of the packet; and forwarding, by the node implementing the ICN routing, the packet to the network element based on the unique ICN content name extracted from the packet payload; and
managing transport layer functionality using the ICN application.

13. The method according to claim 12, wherein the transport layer functionality comprises at least one of the following:
reliability of packet transmission;
retransmission of packets;
congestion control;
flow control;
management of network connections;
management of packet delivery order; and
multiplexing at ports.

14. The method according to claim 12, wherein managing the transport layer functionality comprises encapsulating the packet in a transport layer header prior to delivering the packet over the network.

15. The method according to claim 12, wherein managing the transport layer functionality comprises packaging the content as packets comprising a transport layer header.

16. The method according to claim 12, wherein managing the transport layer functionality comprises selecting a transport layer protocol for use in delivering the content over the network.

17. The method according to claim 12, wherein managing the transport layer functionality comprises selecting a transport layer protocol for delivery of the content.

18. The method according to claim 12, wherein managing the transport layer functionality comprises managing congestion control for delivery of the plurality of packets to the network element.

19. The method according to claim 12, wherein managing the transport layer functionality comprises managing caching at one or more intermediate nodes in the network using the ICN application.

20. The method according to claim 12, wherein managing the transport layer functionality comprises managing reliability of packet delivery.

* * * * *